US012058948B2

(12) United States Patent
Porth et al.

(10) Patent No.: US 12,058,948 B2
(45) Date of Patent: *Aug. 13, 2024

(54) FIELD MONITORING AND DATA COLLECTION SYSTEMS AND METHODS FOR A PRECISION AGRICULTURE SYSTEM

(71) Applicant: CROP SENTRY LTD., Winnipeg (CA)

(72) Inventors: Christopher Brock Porth, Winnipeg (CA); Lysa M. Porth, Winnipeg (CA); Ehsan Tahmasebian, Winnipeg (CA); Vahab Khoshdel, Winnipeg (CA); Kane Anderson, Winnipeg (CA)

(73) Assignee: CROP SENTRY LTD., Winnipeg (CA)

( * ) Notice: Subject to any disclaimer, the term of this patent is extended or adjusted under 35 U.S.C. 154(b) by 290 days.

This patent is subject to a terminal disclaimer.

(21) Appl. No.: 17/551,306

(22) Filed: Dec. 15, 2021

(65) Prior Publication Data

US 2022/0346303 A1    Nov. 3, 2022

Related U.S. Application Data

(63) Continuation of application No. 17/306,202, filed on May 3, 2021.

(30) Foreign Application Priority Data

May 3, 2021    (CA) .................................... 3117042

(51) Int. Cl.
*A01B 79/00*    (2006.01)
*G01C 15/00*    (2006.01)
(Continued)

(52) U.S. Cl.
CPC .......... *A01B 79/005* (2013.01); *G01C 15/002* (2013.01); *G01C 15/06* (2013.01);
(Continued)

(58) Field of Classification Search
CPC ............ G06T 7/10; G06T 2207/10028; G06T 2207/30188; G06T 2207/10024;
(Continued)

(56) References Cited

U.S. PATENT DOCUMENTS

| 10,113,415 | B2 * | 10/2018 | Kozak .................... E21B 47/07 |
| 2004/0032973 | A1 | 2/2004 | Robeson et al. |
| 2017/0161560 | A1 | 6/2017 | Itzhaky et al. |

FOREIGN PATENT DOCUMENTS

| CA | 2 957 081 | 2/2016 |
| CA | 2 937 571 | 1/2017 |

(Continued)

OTHER PUBLICATIONS

U.S. Appl. No. 17/306,202, filed May 3, 2021.
(Continued)

*Primary Examiner* — An H Do
(74) *Attorney, Agent, or Firm* — Frost Brown Todd LLP

(57) ABSTRACT

A sensor network for measuring and processing agricultural sensor measurements having multi-depth sensors, field monitors, and/or field data collection systems. The multi-depth sensor having a GPS; sets of physical sensors located at different depths; a processing structure sampling measurements from the physical sensors; and storing the measurements. The field monitor for use with a mobile platform having: a housing; a camera; a LiDAR sensor; a processing structure capturing point data and image data; generating above-ground field data; and determining crop data. The field data collection system having a stationary field monitor and one or more mobile field monitors capturing above-ground data. The stationary field monitor and the mobile field monitors having an associated GPS. The multi-depth sensors capture below-ground data and communicating the below-ground data to the stationary field monitor. A GPU processes the above-ground data and the GPS data to generate a point cloud data set.

20 Claims, 17 Drawing Sheets

(51) Int. Cl.
    *G01C 15/06* (2006.01)
    *G01S 17/89* (2020.01)
    *G06T 7/10* (2017.01)
    *H04N 23/53* (2023.01)

(52) U.S. Cl.
    CPC ............... *G01S 17/89* (2013.01); *G06T 7/10* (2017.01); *H04N 23/531* (2023.01); *G06T 2207/10024* (2013.01); *G06T 2207/10028* (2013.01); *G06T 2207/30188* (2013.01)

(58) Field of Classification Search
    CPC .......... G01S 17/89; G01S 17/88; G01S 17/86; A01B 79/005; H04N 23/531; Y02A 40/10
    See application file for complete search history.

(56) References Cited

FOREIGN PATENT DOCUMENTS

| | | |
|---|---|---|
| CA | 2 937 574 | 1/2017 |
| CA | 2 990 438 | 1/2017 |
| CA | 3 012 124 | 7/2017 |
| CA | 3 030 684 | 1/2018 |
| CA | 3 074 217 | 3/2019 |
| CA | 3 074 937 | 3/2019 |

OTHER PUBLICATIONS

Christiansen et al., Designing and Testing a UAV Mapping System for Agricultural Field Surveying, Sensors, Nov. 23, 2017, pp. 1-19. (Year: 2017).

\* cited by examiner

FIELD MONITORING AND DATA COLLECTION SYSTEMS AND METHODS FOR A PRECISION AGRICULTURE SYSTEM

RELATED

This application claims priority to U.S. application Ser. No. 17/306,202 filed on May 3, 2021, the contents of which are explicitly incorporated by reference in its entirety.

FIELD

This invention is in the field of precision agriculture, and more specifically to a sensor network for measuring and processing agricultural sensor measurements.

BACKGROUND

Farmers and agronomists spend substantial time with "boots on the ground," physically traveling to each field to monitor plant health, disease pressures, etc., which is used to help make precision agriculture decisions. An individual's effective capacity to scan and assess crops is somewhat limited and is not scalable with a repeatable and dependable process.

Canadian Patent No. 3,074,937 to Dagondon et al. discloses methods and systems for controlling a growth environment of a crop. The growth environment comprises a controller unit, one or more control devices, one or more monitoring devices (also referred to as "sensors"), one or more crops, a camera and a light source. The controller unit is connected to the one or more of the control devices, the one or more of the monitoring devices, the camera and/or the light source. The one or more monitoring devices allow sensing one or more environmental factors via a measurement routine of the growth environment. The camera is an image capturing device generating multimedia files such as, but not limited to, a still camera, a red-green-blue camera, a multi-spectral camera, an hyper-spectral camera, a video camera, etc. The camera may be configured to capture images and/or videos of at least a portion of the crop. The resolution is sufficient to allow quantifying a physiological characteristic of the crop.

Canadian Patent No. 3,012,124 to Xu et al. discloses a method for determining national crop yields during the growing season comprises receiving agricultural data points for a specific geo-locations. An agricultural apparatus having one or more remote sensors fixed thereon, which sensors are communicatively coupled either directly or indirectly via agricultural apparatus to the agricultural intelligence computer system and are programmed to send sensor data to agricultural intelligence computer system. Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus.

Canadian Patent No. 2,990,438 to Baurer et al. discloses systems and methods for capturing images of a field and performing agricultural data analysis of the images. The computer system for monitoring field operations includes a database for storing agricultural image data including images of at least one stage of crop development that are captured with at least one of an apparatus and a remote sensor moving through a field. A processing unit executes instructions to analyze the captured images, to determine relevant images that indicate a change in at least one condition of the crop development, and to generate a localized view map layer for viewing the field at the at least one stage of crop development based on at least the relevant captured images. The source of images during any pass could be a remote sensor (e.g., drone with a camera) that is instructed to track (e.g., lead or follow) the apparatus making the field pass. In another example, a user walks through a field and captures images with a mobile device or tablet device having an image capture device (e.g., camera) and the software application. In another example, a user guides an apparatus (e.g., apparatus with wheels and support frame for positioning image capture devices) having at least one image capture device through a field for capturing images. In another example, a self-guided or self-propelled device or robot moves through a field for capturing images with the software application. The software application controls whether images are captured continuously or during time periods of more stable movement as opposed to unstable movement.

Canadian Patent No. 2,937,571 to Miresmailli et al. discloses systems and methods for monitoring and assessing crop health and performance can provide rapid screening of individual plants. Predictive models predict future health of plants in a crop. A source of sensor data is a mobile sensory platform that has sensors mounted on a vehicle, cart or drone. The mobile sensory platform is activated to move between the plants and capture data relating to some or all of the plants in the crop. The mobile sensory platform may have a different number of sensors than the handheld devices used by the expert and non-expert in activities.

Canadian Patent No. 3,030,684 to Zhong et al. discloses systems and methods for scalable comparisons between two pixel maps are provided. In an embodiment, an agricultural intelligence computer system generates pixel maps from non-image data by transforming a plurality of values and location values into pixel values and pixel locations. The agricultural intelligence computer system converts each pixel map into a vector of values. The agricultural intelligence computer system also generates a matrix of metric coefficients where each value in the matrix of metric coefficients is computed using a spatial distance between to pixel locations in one of the pixel maps. Using the vectors of values and the matrix of metric coefficients, the agricultural intelligence computer system generates a difference metric identifying a difference between the two pixel maps. The difference metric is normalized so that the difference metric is scalable to pixel maps of different sizes.

Canadian Patent No. 2,937,574 to Miresmailli et al. discloses A multi-sensor device comprises a housing containing multiple sensor modules for capturing and transmitting sensor data for plants in a crop. A control unit within the housing is operable to control the sensor modules, and a communications interface is connected to the control unit for transmitting data from said plurality of sensor modules. The sensor modules can include a physiological sensor, a surface analysis sensor, and chemical sensor. The multi-sensor device can be used as a hand-held device or mounted to a mobile platform for use in an automated crop monitoring system.

Canadian Patent No. 2,990,438 to Baurer et al. discloses systems and methods for capturing images of a field and performing agricultural data analysis of the images. In one embodiment, a computer system for monitoring field operations includes a database for storing agricultural image data including images of at least one stage of crop development that are captured with at least one of an apparatus and a remote sensor moving through a field. The computer includes at least one processing unit that is coupled to the database. The at least one processing unit is configured to execute instructions to analyze the captured images, to determine relevant images that indicate a change in at least one condition of the crop development, and to generate a localized view map layer for viewing the field at the at least one stage of crop development based on at least the relevant captured images.

Canadian Patent No. 3,074,217 to Bedoya et al. discloses a method of real-time disease recognition in a crop field. The method comprises causing a camera to continuously capture surroundings to generate multiple images. The method further comprises causing a display device to continuously display the multiple images as the multiple images are generated. In addition, the method comprises processing each of one or more of the multiple images. The processing comprises identifying at least one of a plurality of diseases and calculating at least one disease score associated with the at least one disease for a particular image; causing the display device to display information regarding the at least one disease and the at least one disease score in association with a currently displayed image; receiving input specifying one or more of the at least one disease; and causing the display device to show additional data regarding the one or more diseases, including a remedial measure for the one or more diseases.

U.S. Pub. No. 2017/0161560 to Itzhaky et al. discloses a system and method for predicting harvest yield. The method includes receiving monitoring data related to at least one crop, wherein the monitoring data includes at least one multimedia content element showing the at least one crop; analyzing, via machine vision, the at least one multimedia content element; extracting, based on the analysis, a plurality of features related to development of the at least one crop; and generating a harvest yield prediction for the at least one crop based on the extracted features and a prediction model, wherein the prediction model is based on a training set including at least one training input and at least one training output, wherein each training output corresponds to a training input.

U.S. Pub. No. 2004/0032973 to Robeson et al. discloses a method for predicting or monitoring the economic value of an agricultural commodity, the method includes the steps of remotely obtaining an image data; analyzing the remote image for a predetermined characteristics; using the analysis to determine a viability of the agricultural commodity; and transmitting the viability data to an interested party.

SUMMARY

According to an aspect, there is provided a multi-depth sensor that may have a global positioning sensor; at least two sets of physical sensors located close to at least two different depths; a processing structure executing a plurality of instructions stored on a tangible computer-readable memory.

The multi-depth sensor may have a pipe housing the at least two sets of physical sensors beneath a ground surface. The multi-depth sensor may have an above-ground pipe; and a housing coupled thereto for holding at least the processing structure and the computer-readable memory. The above-ground pipe may have a striking surface for driving the pipe housing beneath the ground surface.

The two or more sets of physical sensors may be spaced at uniform depths beneath the ground surface or the two or more sets of physical sensors may be spaced at varying depths beneath the ground surface. The one or more physical sensors may be selected from at least one of: a moisture sensor, a temperature sensor, a nitrogen/phosphorus/potassium (NPK) sensor, a solar radiation sensor, a rain gauge, and a wind speed sensor.

The instructions may comprise: sampling at least one measurement from the at least two sets of physical sensors; storing the at least one measurement on the memory; communicating the stored measurement via a wireless module to at least one of: a stationary field monitor, a host server, and a mobile field monitor.

According to another aspect, there is provided a field monitor for use with a mobile platform, the field monitor may have a housing coupled to the mobile platform; a camera; a Light Detection and Ranging (LiDAR) sensor; a processing structure executing a plurality of instructions stored on a tangible computer-readable memory. The processing structure may comprise a graphical processing unit (GPU).

The instructions may comprise: capturing point data from the LiDAR sensor; capturing image data from the camera; generating an above-ground field data from the image data and the point data; and determining crop characteristic data.

The instruction may also comprise: filtering the above-ground field data prior to determining the crop characteristic data. The instructions may comprise: filtering the point data set prior to generating the above-ground field data. The instructions may comprise: segmenting crop data points from the above-ground field data as part of the determining of the crop characteristic data. The field monitor may also comprise: a wireless transceiver; and the instructions may comprise: receiving below-ground field data from at least one multi-depth sensor.

According to yet another aspect, there is provided a field data collection system comprising at least one of: a stationary field monitor and at least one mobile field monitor capturing above-ground field data; the stationary field monitor and each of the at least one mobile field monitor having an associated GPS therewith; each of the associated GPS providing GPS data; at least one multi-depth sensor capturing below-ground field data and communicating the below-ground field data to the stationary field monitor; and a GPU processing the above-ground field data and the GPS data to generate a point cloud data set.

The stationary field monitor may comprise a Light Detection and Ranging (LiDAR) sensor and a camera; and each of the at least one mobile field monitor comprises an associated Light Detection and Ranging (LiDAR) sensor and an associated camera; the LiDAR sensor, the associated LiDAR sensors, the camera, and the associated cameras together providing the above-ground field data. The above-ground field data may comprise image data and point data. The GPU may filter the image data and the point data. The GPU may segment a plurality of crop data points from the cloud point data set to determine crop characteristic data. The GPU may adjust the crop characteristic data in response to the below-ground field data.

Any and/or all aspects described herein may be used in any and/or all combinations.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Figure 1:
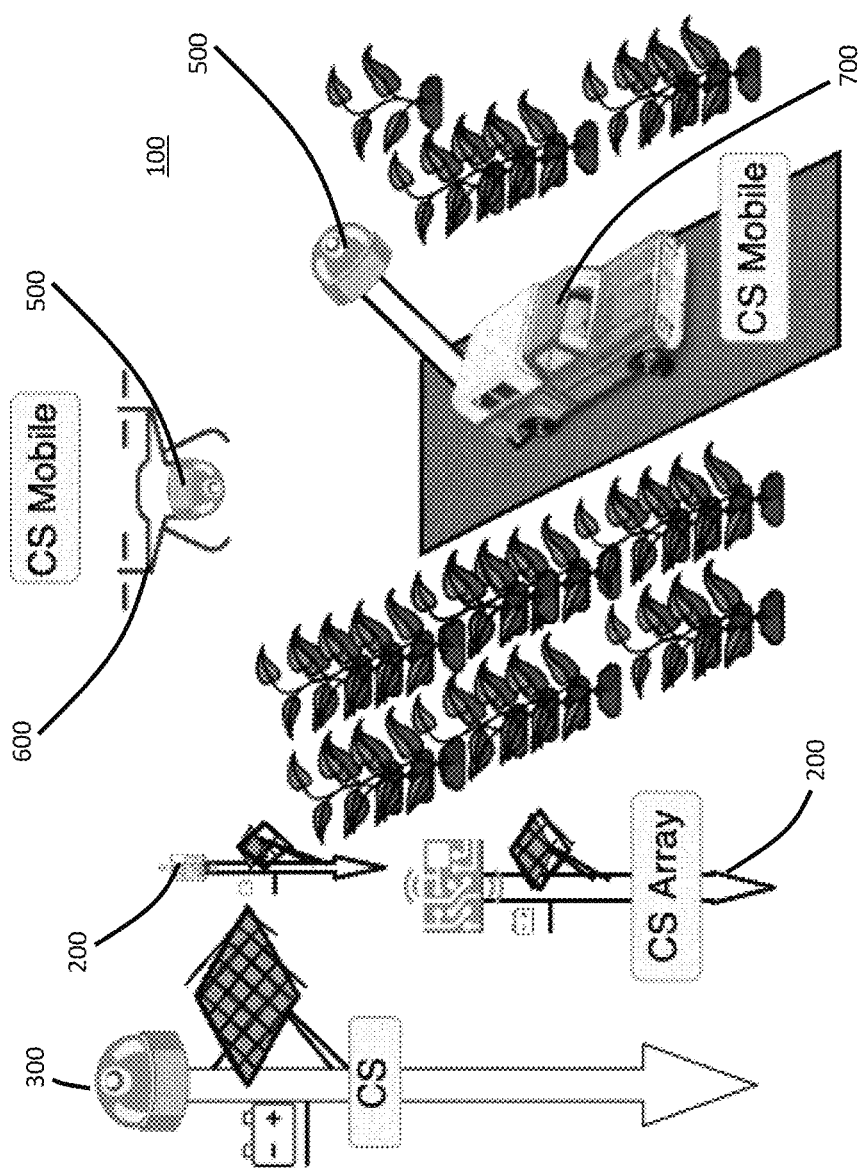
FIG. 1 is an overview diagram of a plurality of collection devices for measuring, transmitting, and/or receiving field data for a precision agriculture system.

The agriculture sector is facing tremendous challenges in feeding the world's growing population, and simultaneously responding to the risks posed by climate change. The decisions that individual producers make on their farms are important to maximizing productivity and achieving sustainable agriculture, and precision agriculture and other Best Management Practices (BMPs) play an important role in sustainable intensification. As described herein, measurement and optimization of crop yields and the use of inputs may be achieved.

The techniques as described herein may improve at least one of: crop health monitoring, pest monitoring, plant protein management, crop phenotyping, and/or more broadly decision support systems and/or insurance.

Crop phenological development is a highly complex trait characterized by multiple environmental factors such as weather and soil conditions, and their interactions with non-environmental factors driven by farm management practices such as crop and fertilizer management. This development process can be mapped to one or more daily observations of crop development using the techniques described herein.

The machine learning (ML) and field monitoring systems and methods may provide data intensive science in a multi-disciplinary, agri-technologies domain. However, a challenge in developing ML-based systems and methods for crop phenological modeling may be a lack of accurate, non-destructive methods that measure one or more biophysical responses of the crop throughout the growing season rather than only at harvest.

The monitoring systems and method described herein demonstrate an AI-driven device and software platform for real-time (24-7), autonomous, and/or non-destructive crop monitoring. The techniques herein may provide real-time visual monitoring leading to quantitative data and absolute crop monitoring, protein management, decision support, and/or insurance applications, and may overcome technological hurdles pertaining to cost, scale/range, image quality, computational intensity, autonomous data collection, and archiving, and seamless interoperability.

The techniques herein may lead to increased productivity and/or reduced negative externalities from crop production while reducing GHG emissions. Through better field monitoring may lead to higher economic returns, while also reducing environmental risk. The techniques herein may provide a source of precision agriculture (PA) data important for developing in-season artificial intelligence-based decision making models. These techniques may increase a return-on-investment of PA-based technologies leading to higher adoption across farms and thus increased economic returns and more sustainable farming practices.

In Canada, approximately 10% of GHG emissions are from crop and livestock production. The main gases emitted by crop production activities include carbon dioxide ($CO_2$) and nitrous oxide ($N_2O$), where $N_2O$ is 300 times stronger climate gas than $CO_2$. The techniques described herein may provide advantages for BMPs in order to reduce or eliminates one or more environmental risks. In particular, the BMPs may optimize one or more of pesticide handling, energy efficiency, and water quality. In addition, the BMPs may take into consideration legislation, practicality, and operational needs for a specific operation. BMPs that optimize nitrogen use can have a significant impact on GHG emission reductions (where $N_2O$ results from having excess fertilizer in the field, which is not absorbed from the plants during the cycle). Research shows that PA technologies, such as using Variable Rate Technology (VRT), which may allow one or more of: fertiliser, chemicals, lime, gypsum, irrigation water, and/or other farm inputs to be applied at different rates across a field, without manually changing rate settings on equipment or having to make multiple passes over an area, may significantly reduce emissions by applying an optimized amount of fertilizer, at a right place and/or time, to meet crop demands, avoiding excess amounts leftover (4R stewardship).

The technology herein may provide real-time crop phenological response data throughout the growing season to build informed decision support algorithms. The technology may generate 3D point cloud data where each point may be defined by coordinates in space, which may then be rendered as a mesh to create a highly accurate 3D model. The 3D point cloud may provide biomass classification, phenological structure segmentation, and/or biophysical parameter quantification. The point clouds may handle large datasets and provide a high-throughput and high-density method of collecting data and may penetrate and collect measurements from within a crop canopy.

Turning to FIG. 1, a plurality of collection devices 100 for measuring, transmitting, and/or receiving field data for a precision agriculture system may be provided. The plurality of collection devices 100 may comprise one or more stationary field monitors 300 (described in further detail with reference to FIGS. 3 to 5 below), one or more multi-depth sensors 200 (described in further detail with reference to FIGS. 3, and 6 to 7 below), and/or one or more mobile field monitors 500 (described in further detail with reference to FIGS. 8-15 below) on associated mobile platforms 600, 700. In this aspect, the mobile platform 600, 700 may be an aerial drone 600 and a land-based vehicle 700, such as a truck, tractor, and/or ATV. In some aspects, the land-based vehicle 700 may be a cart pulled by a person or other type of animal.

Figure 2:
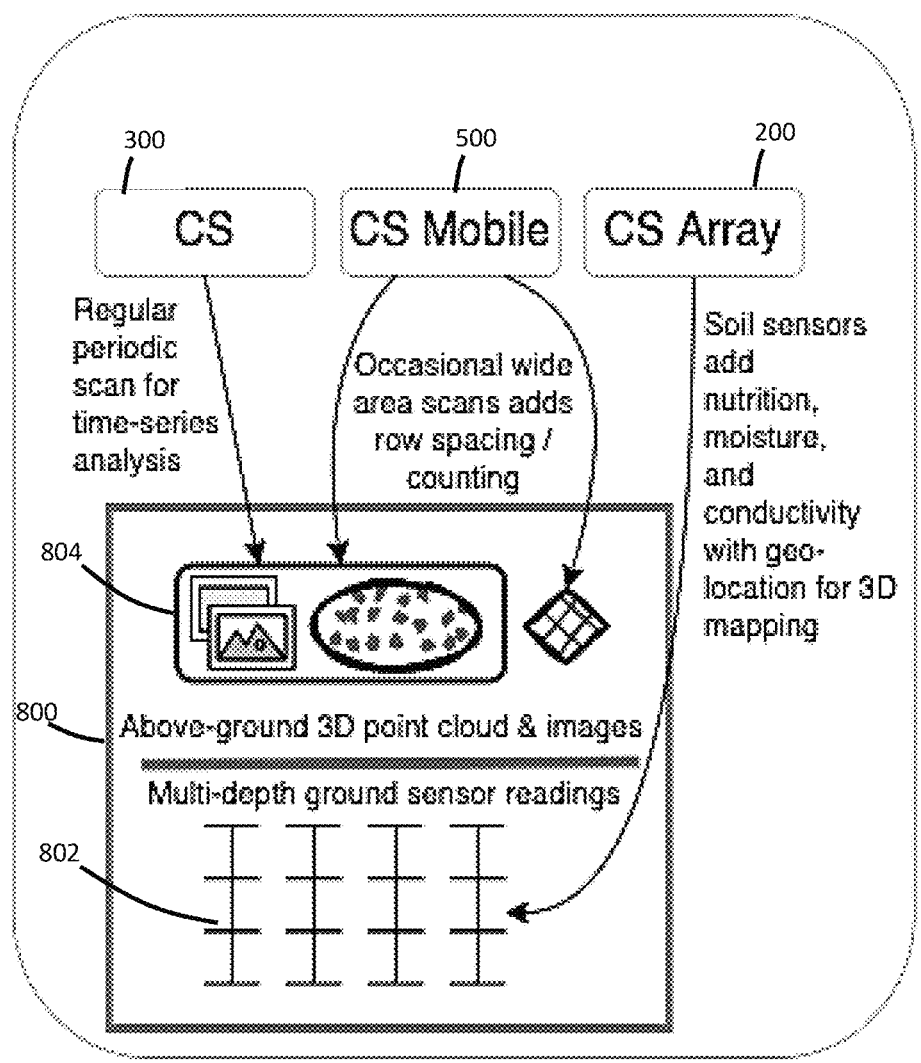
FIG. 2 is a conceptual diagram of the plurality of collection devices providing field data.

As shown in FIG. 2, the plurality of collection devices 100 provide field data 800, which may be a combination of above-ground field data 804 and/or multi-depth field data 802. In this aspect, the above-ground field data 804 may be provided by the stationary field monitors 300 and/or the mobile field monitors 500. The stationary field monitors 300 may provide regular, periodic scans to produce above-ground field data 804 for time-series analysis. The mobile field monitors 500 may provide occasional wide-area scans to produce additional above-ground field data 804 comprising row spacing and/or counting. The multi-depth field data 802 may be provided by the multi-depth sensors 200. The multi-depth field data 802 may comprise soil sensor data such as nutrition, moisture, and/or conductivity with geo-location for 3D mapping.

Figure 3:
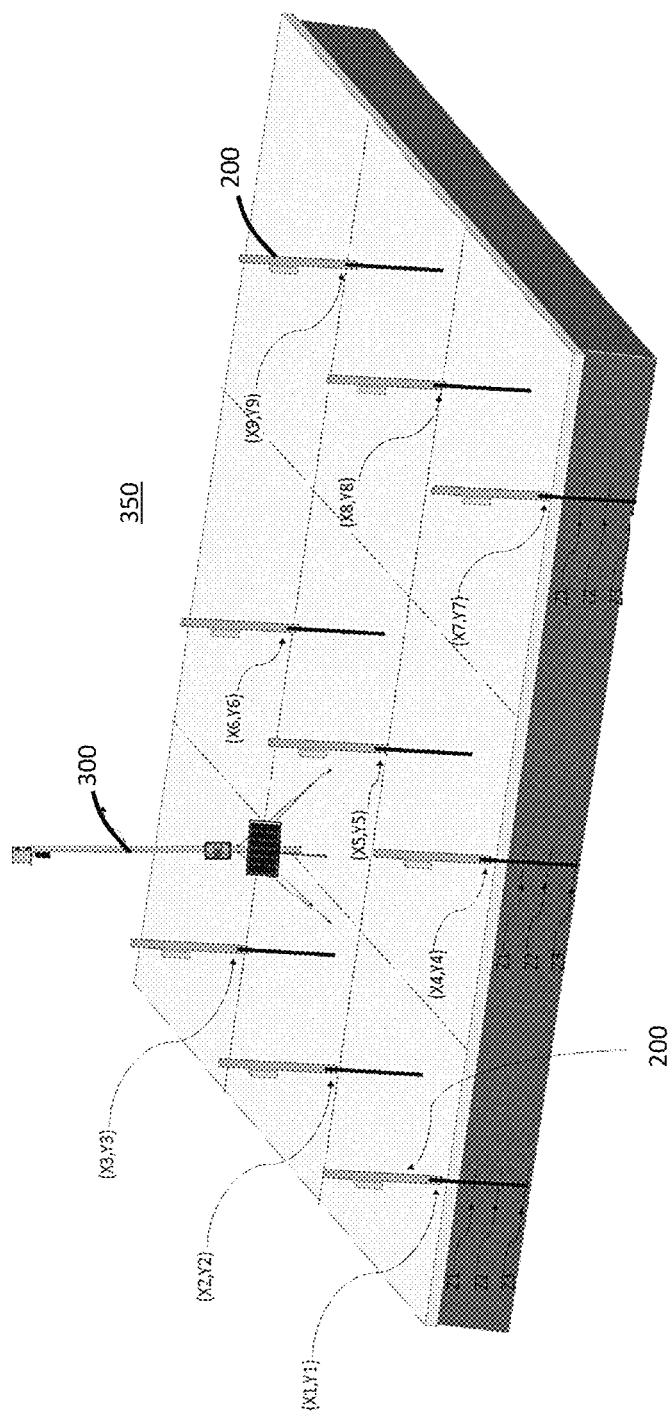
FIG. 3 is a perspective cross-section view of an example field with a stationary precision agriculture system.

As shown in FIG. 3, an example field may comprise a stationary collection system 350 installed thereon. The stationary collection system 350 may comprise one or more stationary field monitors 300 and/or one or more multi-depth sensors 200. In this aspect, the multi-depth sensors 200 may be evenly spaced throughout the field. In other aspects, the multi-depth sensors 200 may be unevenly spaced throughout the field. In even more aspects, the stationary field monitor 300 may determine which areas of the field have a high density of multi-depth sensors 200 and which areas of the field have a low density of multi-depth sensors 200. In FIG. 3, nine multi-depth sensors 200 may communicate with the stationary field monitor 300. Other aspects may have fewer multi-depth sensors 200 or more multi-depth sensors 200.

Figure 4:
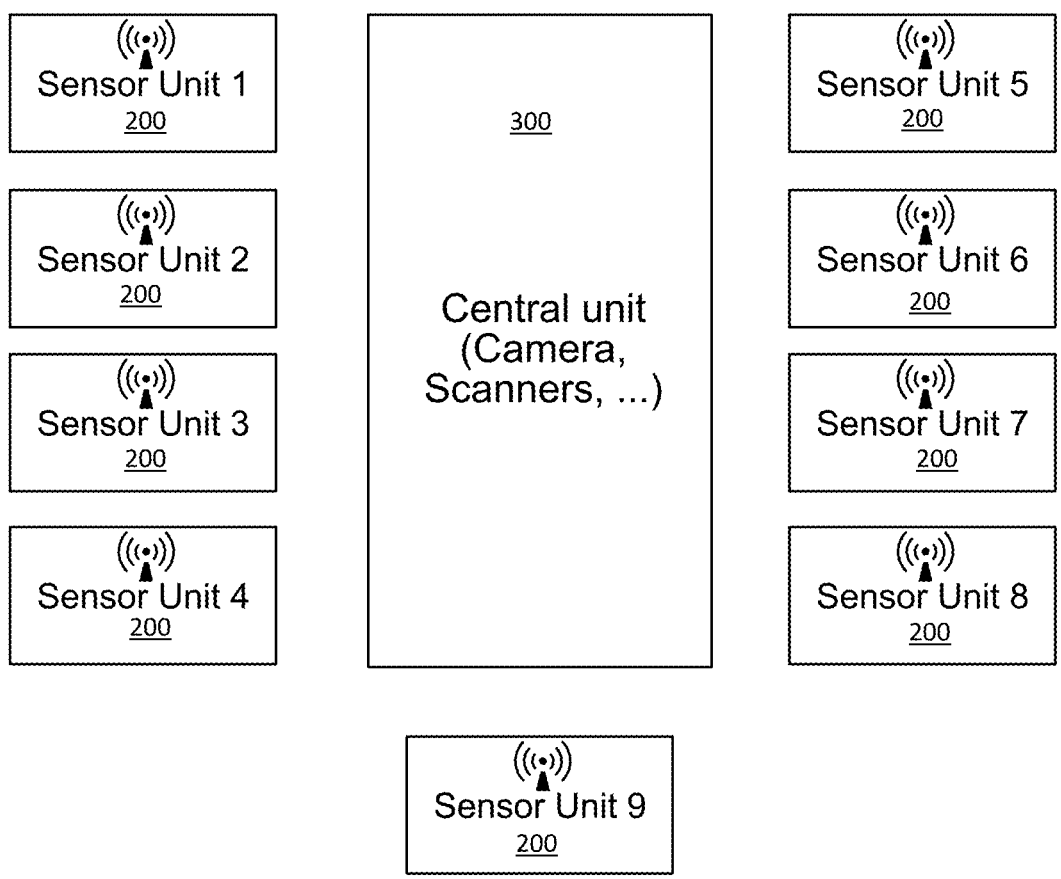
FIG. 4 is a block diagram of a stationary field monitor in communication with a plurality of sensor units.

Turning to FIG. 4, the stationary field monitor 300 may wirelessly communicate with the multi-depth sensors 200. In this aspect, the homogenous multi-depth sensors 200 may be identical in configuration and/or functionality. Other aspects may have heterogeneous multi-depth sensors 200 that may have different configurations and/or functionality. The multi-depth sensors 200 may comprise at least one of: a humidity sensor, an NKP sensor, a conductivity sensor, a temperature sensor, and/or any combination thereof. Although FIG. 4 demonstrates nine multi-depth sensors 200, the number of multi-depth sensors 200 may be increased depending on the type of wireless communication technology being used. A range between each multi-depth sensor 200 and the stationary field monitor 300 may range from about 10-meters to about 10-kilometers depending on a range of the wireless communication system.

Figure 5:
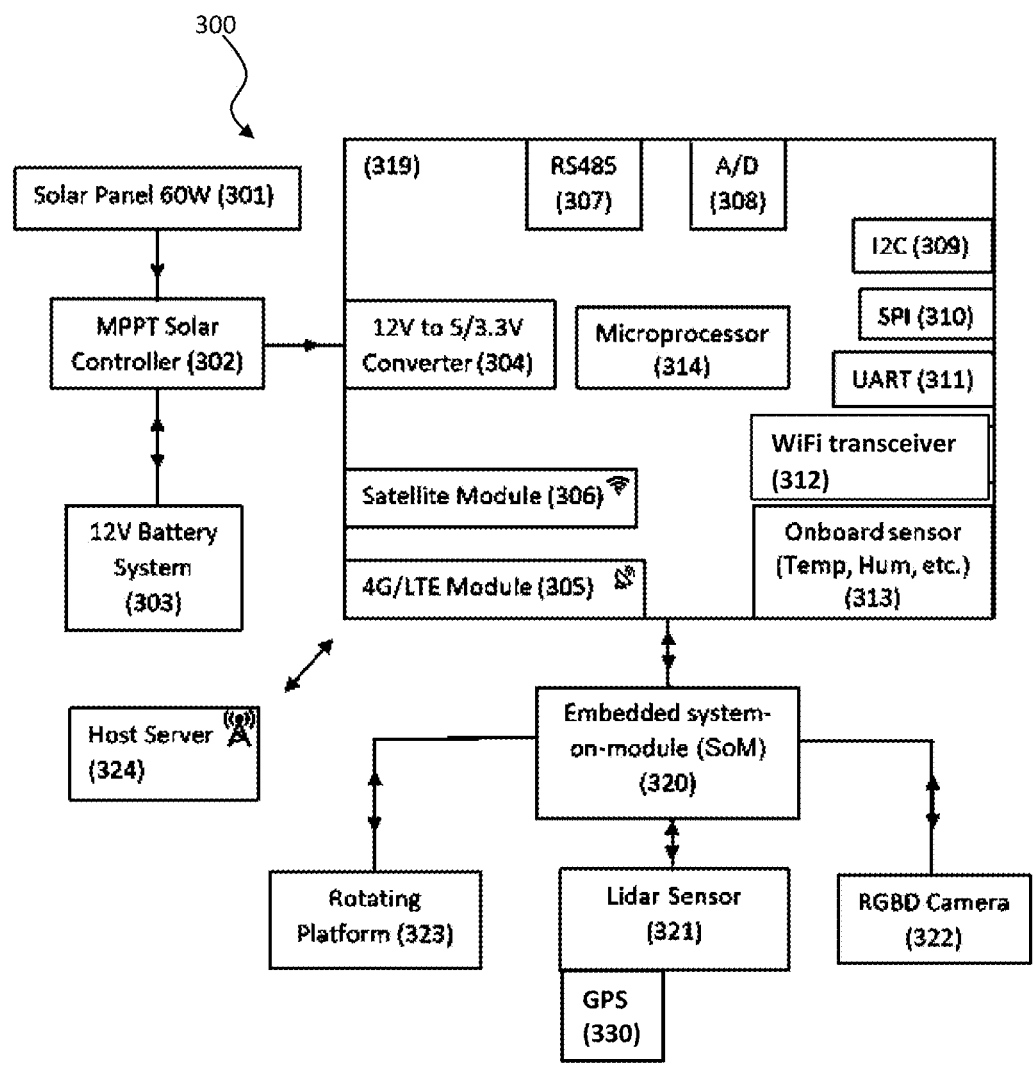
FIG. 5 is a block diagram of the stationary field monitor and/or the field monitoring system.

As shown in further detail in FIG. 5, one or more components of the stationary field monitor 300 (or field monitor system) is shown. The stationary field monitor 300 may be powered by a solar panel 301 supplying power to a battery 303 in order to keep the battery 303 charged. In this aspect, the solar panel 301 may be rated to 50-Watts, although other aspects may have a higher or lower wattage dependent on the power requirements, and/or the battery 303 may be a 12-Volt battery 303. In this aspect, the battery 303 is a lead-acid battery that may have an operational range from −40° C. to +50° C. The battery 303 may have a shelf life @ 25° C. of 2 years and a float life @2.27-V per cell of 10 years @ 25° C. The cycle life of the battery 303 may be 40% to 80% depth of discharge (DOD).

A maximum power point tracker (MPPT) 302 may adjust a voltage of the solar panel 301 to absorb a maximum power in various lighting conditions. A high-efficiency voltage converter 304 may step down the 12-V battery 303 to 5-V and/or 3.3-V for a controller 319 and/or associated circuitry.

A battery management system (BMS) may comprise one or more instructions executing on the microprocessor 314. The instructions may ensure that a charge/discharge cycle of the battery 303 precisely follows the technical specification to maximize the life of the battery 303. The BMS may keep a state of charge (SOC) of the battery 303 to above 80% at all times in order to maximize a lifetime of the battery 303. The BMS may be capable of waking up the stationary field monitor 300 to complete a measurement and going into a sleep mode. While in sleep mode, the stationary field monitor 300 may use less than 50-mA of current to conserve a lifetime of the battery 303.

The BMS may comprise instructions to suspend performing the measurement if the BMS anticipates that the battery 303 may fall below 80% of full capacity of the battery 303. A lower than 80% of full capacity of the battery 303 may only rarely be experienced, such as a prolonged period of cloudy weather and/or a defective or covered solar panel 301. In such instances, the BMS may execute instructions to send a notification via the cellular module 305. The lifetime of the battery 303 may depend on many factors including a depth of discharge (DOD), and a number of discharge/charge cycles which is controlled by the BMS. The BMS may also maximize the lifetime of the battery 303 based on a precise charging/discharging algorithm specific to a battery type. The BMS may allow the battery 303 to last longer than five or ten years. The BMS may also monitor a state of health (SOH) of the battery 303 and may report the state of health periodically to a host server 324. The state of health may permit a user to replace the battery 303 before an end of the lifetime to permit a continuous operation of the stationary field monitor 300.

In general, if the battery 303 is to be discharged frequently, a cycle life rather than a calendar life may be more relevant. Conversely, if the battery 303 is to be used primarily as power backup, the calendar life of the battery 303 should be considered. The BMS may comprise instructions to execute an optimization to have a maximum calendar life while still cycling once a day with a minimum DOD. In order to determine if the battery 303 is cycling or on standby (float), then the following criteria may be considered by the BMS. If a minimum time between two discharges is not less than fourteen days, the battery 303 may be considered on standby. In order to maintain the battery 303 on standby during a measurement cycle, the BMS may initiate the measurement cycle to correspond to when the solar panel 301 may be providing a near maximum amount of energy. The measurement cycle during the maximum solar radiation time period may also be advantageous to the image measurements as a maximum illumination may be provided.

The stationary field monitor 300 may perform two measurements per day for approximately 6 months in a year. A single measurement may take approximately 6 minutes per measurement cycle. This measurement pattern may result in 365 battery cycles per year with less than 10% DOD. The stationary field monitor 300 may use approximately 30-W of power during each 6 minute measurement and therefore would consume 3-Wh or 2% of a total capacity of the battery 303.

The controller 319 may comprise a processor 314 and an associated tangible computer-readable memory (not shown) storing one or more instructions to execute one or more routines, such as a self-diagnostic or a power-up routine, as described herein in further detail below. The controller 319 may provide one or more communication interfaces. In this aspect, the communication interfaces may comprise a cellular module 305 (e.g. 4G/LTE transceiver), a satellite transceiver module 306, and/or an WiFi transceiver module 312 for communication with a host server or cloud storage 324. One or more sensor interfaces may comprise one or more RS485 interfaces 307, one or more analog-to-digital converter (ADC) 308, one or more Inter-Integrated Circuit (I2C) interfaces 309, one or more serial peripheral interfaces (SPI) 310, and/or one or more Universal Asynchronous Receiver-Transmitter (UART) interfaces 311. These sensor interfaces may be configured to interface with one or more industrial and/or agricultural sensors external to the controller 319. In this aspect, the microprocessor 314 may communicate with up to 32-sensors with a cable length of 800-meters over the RS485 interface 307 using a Modbus protocol.

The controller 319 may comprise a number of onboard sensors 313, such as a temperature sensor, a humidity sensor, a pressure sensor, a soil moisture sensor, a soil resistance sensor, a nitrogen/phosphorus/potassium (NPK) sensor, a rain gauge, and/or solar radiation sensors, etc. Each sensor may have one or more interfaces in order to communicate with the microprocessor 314, such as the SPI 310, the I2C 309, Modbus, and/or a direct interface. The type of sensor 313 may vary according to one or more crop characteristics and/or an impact of that data on a yield prediction model described in further detail below. The controller 319 may be capable of two-way communication with the sensors 313 and the sensors 313 may determine parameters such as a leaf thickness, a leaf wetness, a wind speed, a wind direction, a temperature, a pressure, a humidity, a solar radiation, a soil moisture, and/or a soil chemistry. A sampling interval for each of the sensors 313 may be adjusted automatically or manually as required. The sampling interval may depend on a sensor type and a rate of change expected in the measurement data. The microprocessor 314 may automatically adjust the sampling interval to ensure an accuracy of continuously measured data while addressing memory storage available on the controller 319. For example, for a temperature measurement, the sampling interval of every twenty to sixty seconds may be sufficient. In another example for a pressure measurement, a faster sampling interval may be more appropriate.

The microprocessor 314 may execute a data transfer routine from the memory. When the data transfer routine is executed, the cellular module 305 may transfer an amount of data to the host server 324. If the cellular module 305 reports a weak and/or no cellular signal, then the data transfer routine may then transfer the amount of data over the satellite module 306. The cellular module 305 may communicate using any method of cellular transmission, such as text message, email, pager alert, SMS (short message service), MMS (multimedia message service), etc. The data transfer routine may also receive one or more commands from the host server 324 to make a decision and/or change of settings.

The microprocessor 314 may execute a self-diagnostic routine every time that the controller 319 initializes to take a measurement from the sensors 313. The self-diagnostic routine may monitor a battery health and/or may review a raw data collection routine to determine one or more abnormal and/or unexpected readings. If an abnormal state is determined, the self-diagnostic routine may send an alert via the data transfer routine. In this aspect, the alert may comprise a brief description of the abnormal state. In another aspect, the self-diagnostic routine may reinitialize the controller 319 using an initialization routine.

The controller 319 may interface with a graphical processing unit (GPU) 320. The controller 319 and the GPU 320 may collectively be referred to as a processing structure. In this aspect, the GPU 320 comprises an embedded system-on-module (SoM). The GPU 320 may execute instructions for one or more machine learning routines, one or more artificial intelligence (AI) routines, and/or one or more data processing routines for crop data. The controller 319 may request data processing from the GPU 320 for one or more of the sensors 313. In particular, the controller may request data processing from the GPU 320 for one or more sensors 313 that have a high-resolution and/or a high sampling rate. In some aspects, the microprocessor 314 and the GPU 320 may be the same processor in the processing structure.

In this aspect, the GPU 320 may receive point data directly from a Light Detection and Ranging (LiDAR) sensor 321 via a Gigabit Ethernet (GigE) interface (not shown) using IEEE 1588-2008 for data synchronization. The GPU 320 may also communicate with the controller 319 via the Ethernet interface (not shown). The LiDAR sensor 321 may be an ultra-high point cloud precision and density sensor that may feature an angular precision of 0.03-degrees and/or a beam-divergence angle of 0.12-degrees in a vertical direction and 0.02-degrees in a horizontal direction. The LiDAR sensor 321 may sample point data at approximately 40 megabytes (MB) of data every 10 seconds (e.g. approximately 33.5 Mbps), at a resolution of approximately 2-cm, up to a distance of 500-m radially per LiDAR sensor 321. The LiDAR sensor 321 may be IP67 rated (e.g. a dust protected rating of 6 and a water immersion rating of 7). The LiDAR sensor 321 may integrate with a network hub (not shown) to generate georeferenced 3D point cloud data. Multiple LiDAR sensors 321 may be connected to the same network hub (not shown) in order for the GPU 320 to integrate all or most of the point data into a combined output. In this aspect, the LiDAR sensor 321 may also comprise a GPS sensor 330 in order to provide one or more GPS coordinates to the controller 319. Other aspects may have the GPS measurements provided by the GPS sensor 330 located in the cellular module 305 and/or satellite modules 306. In other aspects, an independent GPS sensor 330 may be present on the controller 319.

Similarly, the GPU 320 may receive sensor data directly from a colour/depth (RGBD) camera 322. The RGBD camera 322 may be an enhanced vision-based camera that assigns image data to a cloud of point data. The camera 322 may interface with GPU 320 via the Gigabit Ethernet (GigE) (not shown) and/or USB. The GPU 320 may perform a data fusion process on the image data the camera 322 and the point data from the LiDAR sensors 321 to generate a 3D-color-assigned cloud point data set.

As may be appreciated, the high-throughput 3D scanning may be extremely computationally intensive and may provide sampling of approximately 200,000 points, or more, per second. By providing the GPU 320 executing machine learning processing and/or compression on the stationary field monitor 300, the resultant data may be more efficiently transferred to the cloud storage 324.

Figure 6:
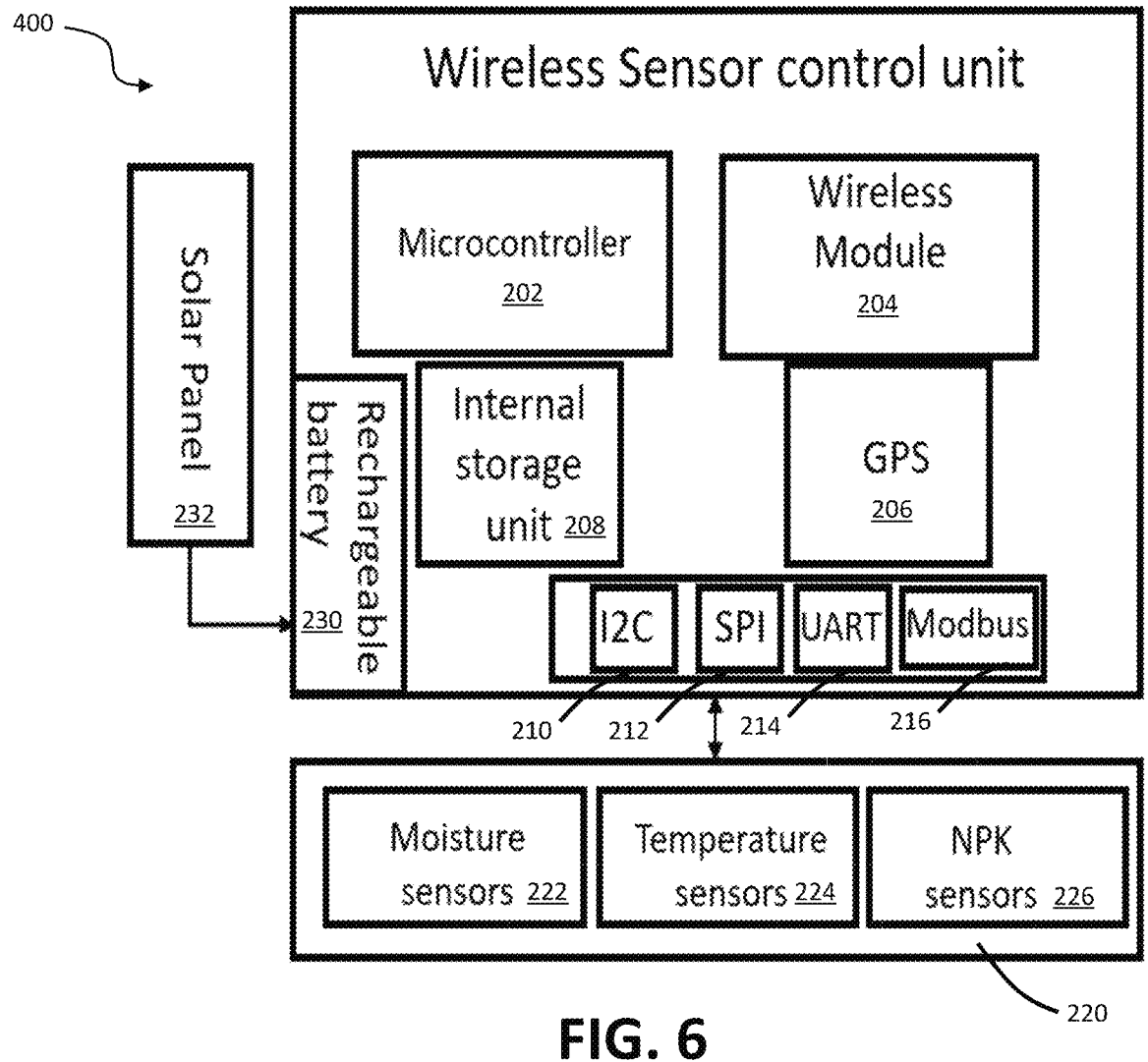
FIG. 6 is a block diagram of a wireless sensor unit.

Turning to FIG. 6, an electronic system or processing structure 400 of one of the multi-depth sensors 200 (or wireless sensor control units) is shown. Power may be provided to all of the electronic components of the system 400 via a rechargeable battery 230 that may be charged using one or more solar panels 232. The multi-depth sensor 200 may comprise a microcontroller 202 executing one or more instructions from an internal storage memory 208 as set forth in further detail below. The microcontroller 202 may communicate with a wireless module 204 via a communication channel (e.g. a bus or the like) in order to transmit and/or receive messages and/or data wirelessly from/to the stationary field monitor 300 and/or from/to other multi-depth sensors 200. A data rate of the wireless network may be between about 50-kb/s to 5-Gb/s.

The microcontroller 202 may retrieve global positioning coordinates for the multi-depth sensor 200 via a global positioning sensor (GPS) 206. Due to the wireless design of the multi-depth sensor 200, the farmer may change the location of the sensor 200 in order to monitor different parts of the field. As described in further detail below, a captured colorized point cloud data generated by the stationary field monitor 300 may be georeferenced and the GPS coordinates from the sensors 200 may be used to map one or more measured soil characteristics to the point cloud data.

The microcontroller 202 may retrieve measurement data from one or more physical sensors 220 via one or more communication interfaces, such as Inter-Integrated Circuit (I2C) 210, serial peripheral interfaces (SPI) 212, Universal Asynchronous Receiver-Transmitter (UART) 214, and/or an RS485 interfaces using a Modbus protocol 216.

In this aspect, the physical sensors 220 may be one or more of a moisture sensor 222, a temperature sensor 224, a nitrogen/phosphorus/potassium (NPK) sensor 226, an electrical conductivity (EC) sensor (not shown) and/or any combination thereof. In some aspects, the physical sensors 220 may also comprise environmental sensors such as solar radiation sensors (e.g. the solar panels 232), rain gauges, and/or wind speed sensors (not shown).

The microcontroller 202 may execute instructions to sample each of the physical sensors 220, store one or more sampled values in the memory 208, and/or may communicate the stored sampled values to the stationary field monitor 300 via the wireless module 204. In some aspects, the microcontroller 202 may directly communicate with a server (not shown) via a cellular transceiver (not shown).

Each soil sensor microcontroller 202 may operate with low power, going to sleep for hours at a time. The microcontroller 202 may wake on a regular periodic interval to perform measurements at a configurable rate, such as once per hour or once per day, or any other interval. The stored sampled values may be relayed upon completion of each reading and may comprise readings of all or some of the physical sensors 220. The stored sampled values may be relayed to the stationary field monitor 300, or in some aspect, the stored sampled values may be relayed to directly to one or more servers through a wireless connection such as LTE or satellite. The sampling rate of the physical sensors 220 may be synchronized to the regular periodic interval of the microcontroller 202.

Figure 7:
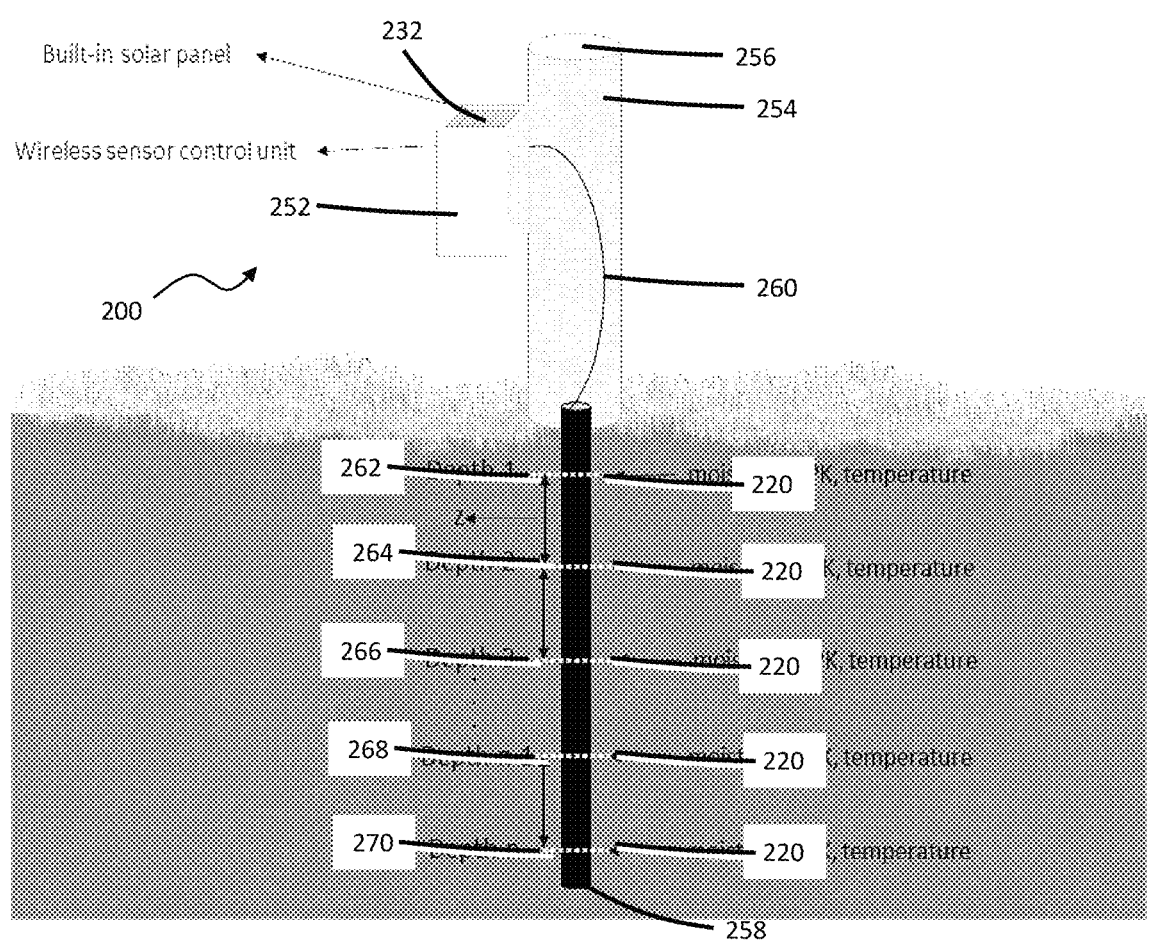
FIG. 7 is a cross-sectional side view of the wireless sensor unit.

Turning to FIG. 7, a physical structure of the multi-depth sensor 200 is shown. The electronic system 400 may be within a housing 252 with the solar panel 232 located at or near a top of the housing 252. The housing 252 may be bolted or attached in some other manner to a generally cylindrical above-ground pipe 254 constructed of steel or other durable metal. On an upper surface 256 of the pipe 254 may be a striking surface 256 suitable to striking with a sledgehammer without damaging the pipe 254. A sensor pipe 258 may be coupled to an opposite end of the pipe 254 from the striking surface 256. The sensor pipe 258 may be constructed of a suitable material to facilitate being driven into the soil of the field. In other aspects, an auger (not shown) or drill may bore a hole for placement of the sensor pipe 258. A mud slurry may then be poured into the hole in order to encase the sensor pipe 258. In some aspects, the above-ground pipe 254 and the housing 252 may be the same (e.g. the electronic system 400 may be housed in the above-ground pipe 254).

The suitable material may also withstand corrosion and/or other deleterious effects of being in the soil for extended periods of time. At the base of the sensor pipe 258 may be a spike to facilitate driving the sensor pipe 258 into the soil. The sensor pipe 258 may be generally hollow in order for a cable 260 to travel from the housing 252 to each of the physical sensors 220 beneath the soil. In this aspect, the pipe 254 and/or the sensor pipe 258 may be selected from at least one of: plastic, such as PVC or ABS, galvanized steel, stainless steel, and/or anodized aluminum.

The sensor pipe 258 may comprise one or more sets of the physical sensors 220 in a spaced relationship to each other along a length of the sensor pipe 258 such that when the sensor pipe 258 is driven into the soil, each of the sets of physical sensors 220 may be at different depths 262, 264, 266, 268, 270. In this aspect, the spacing between each of the sets of the physical sensors 220 is uniform (e.g. 10-cm between each set of physical sensors 220). In this aspect, the depths 262, 264, 266, 268, and 270 are 10-cm, 20-cm, 30-cm, 40-cm, and 50-cm respectively. Other aspects may have varying distance between the sets of the physical sensors 220. For example, the sets of the physical sensors 220 may be closer in depth to each other near the surface whereas the sets of the physical sensors 220 being further apart at increasing depths beneath the surface. The sets of the physical sensors 220 may be exposed to the surrounding soil in order to facilitate measurements from the soil. The physical sensors 220 may be IP68 rated and suitable for permanent installation in the soil over long periods of time (e.g. 2-3 years without maintenance). Although the aspect in FIG. 5 demonstrates the same set of the physical sensors 220 at each depth 262, 264, 266, 268, 270, other aspects may have different sets of the physical sensors 220 at each depth 262, 264, 266, 268, 270.

Figure 8:
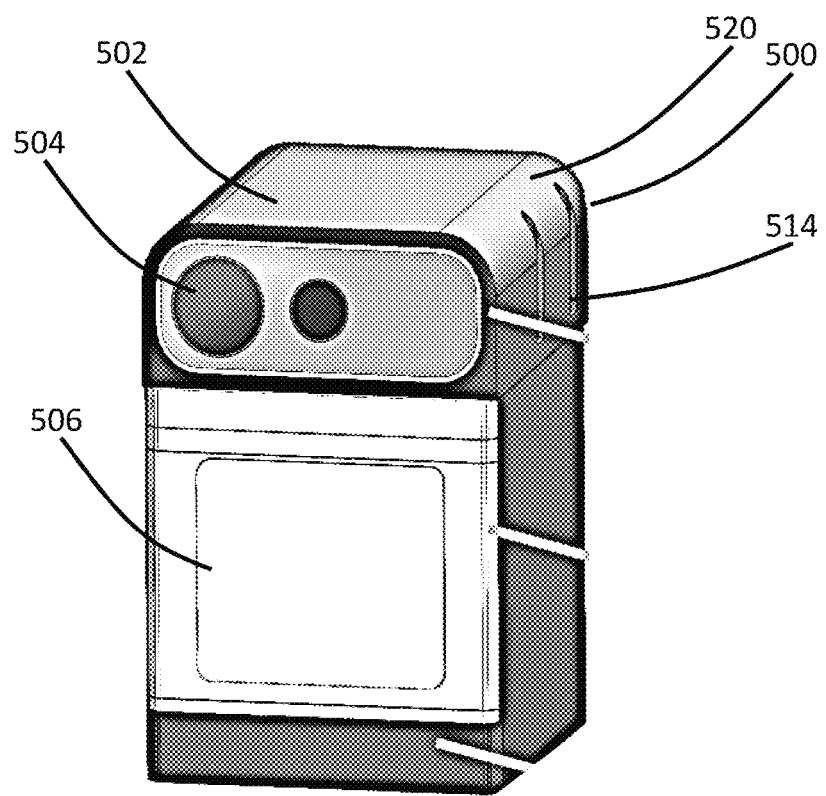
FIG. 8 is a perspective front view of a field monitor for coupling to a mobile platform.

Turning to FIG. 8, the mobile field monitor 500 is shown uncoupled from the mobile platforms 600, 700. The mobile field monitor 500 comprises a number of electronic components 550 within a housing 502 described in further detail below. In this aspect, the housing 502 may be generally rectangular prism with a pair of rounded edges 520 at a top of the housing 502. The pair of rounded edges 520 may be on a right-hand top edge and a left-hand top edge. The housing 502 may comprise a pair of vertical grooves 514 along a camera portion of the housing 502. In this aspect, the grooves 514 may be on both the right-hand side and the left-hand side of the housing 502 to permit access to at least one screw.

In this aspect, the housing 502 may contain one or more windows 504 for the camera 322 located proximate to a top front of the housing 502. The housing 502 may also contain one or more windows 506 for a LiDAR sensor 321 located below the window 504 for the camera 322. Within the housing 502 may be one or more processing structures 550. In this aspect, the housing 502 comprises a single housing. In other aspects, the housing 502 may comprise a camera housing, a LiDAR sensor housing, and a processing structure housing coupled together.

Figure 9:
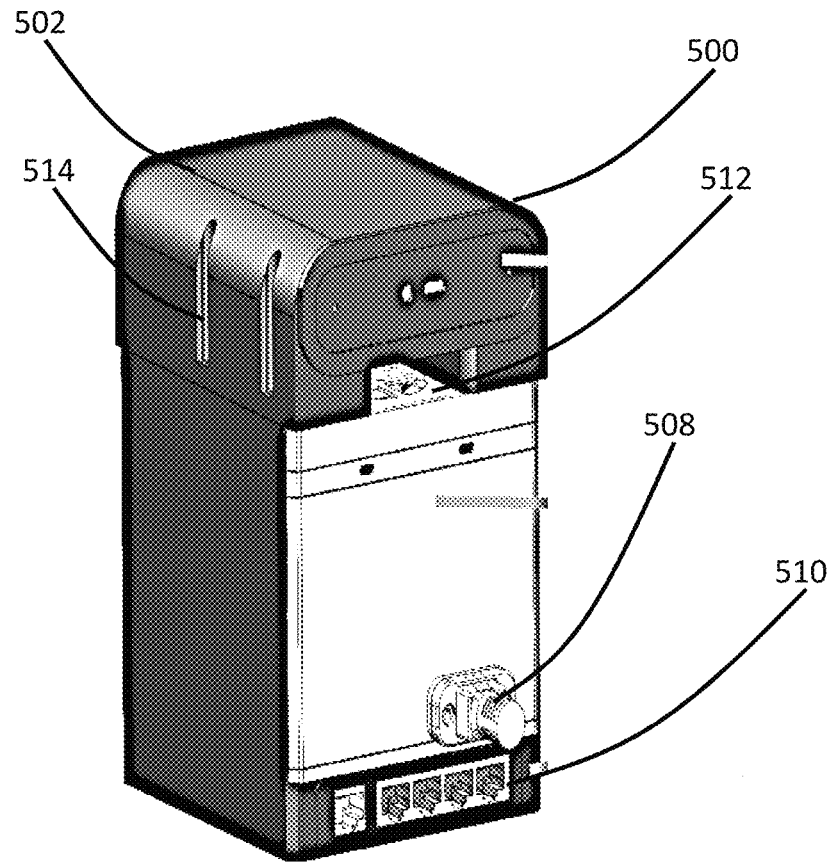
FIG. 9 is a perspective rear view of the field monitor for coupling to the mobile platform.

A rear view of the housing 502 is shown in FIG. 9. A mount 508 may be on a rear of the housing 502 for coupling the mobile field monitor 500 to the mobile platforms 600, 700. In this aspect, the mount 508 is located at or near the bottom of the housing 502. Below the mount 508 may be one or more ports 510 for connecting the processing structure 550 to charge an internal battery and/or for communication with the processing structure 550. In some aspects, the ports 510 may be for connection to the camera 322 and/or the LiDAR sensor 321. In some aspects, the ports 510 may comprise two Ethernet ports, two USB ports, a UART, and/or other types of communication ports. The housing 502 may have one or more vents 512 for providing ventilation for the internal electronic components. In this aspect, the vent 512 provides ventilation for the LiDAR sensor 321 and may comprise an exhaust fan (not shown).

Figure 10:
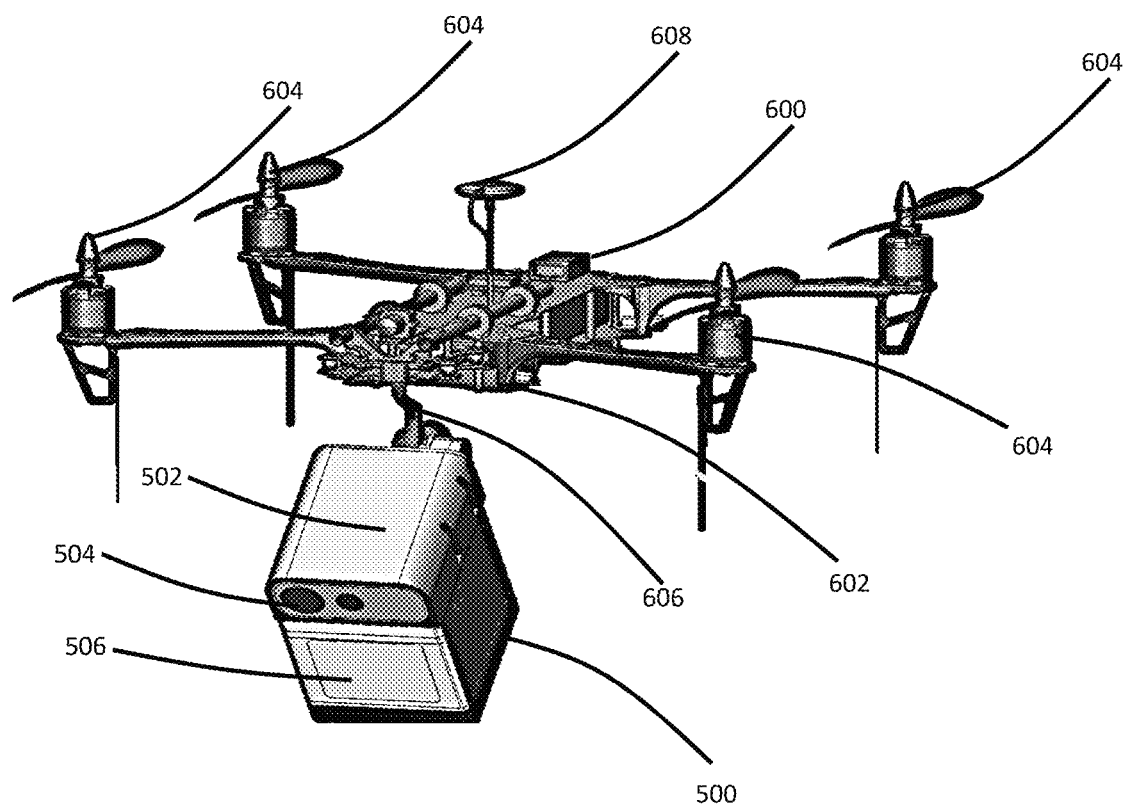
FIG. 10 is a perspective front view of the field monitor coupled to a mobile platform (e.g. drone)

As shown in FIG. 10, the mobile field monitor 500 may be mounted to the mobile platform 600. In this aspect, the mobile platform 600 comprises a drone. The mobile platform 600 may comprise one or more propellers 604 coupled to a frame 602. The mobile platform 600 may comprise a positioning antenna 608 coupled to a mast above the frame 602. The housing 502 of the mobile field monitor 500 may be coupled to the frame 602 with the mount 508 to a corresponding mount 606 on the mobile platform 600. In some aspects, one or more electronics of the mobile platform 600 may couple to the processing structure 550 of the mobile field monitor 500 through the mounts 508, 606. For example, the mobile platform 600 may provide positioning data from the positioning antenna 608 to the processing structure 550 of the mobile field monitor 500. In some aspects, the mobile platform 600 may be used to determine a scanning path 1204 for the mobile field monitor 500.

Figure 11:
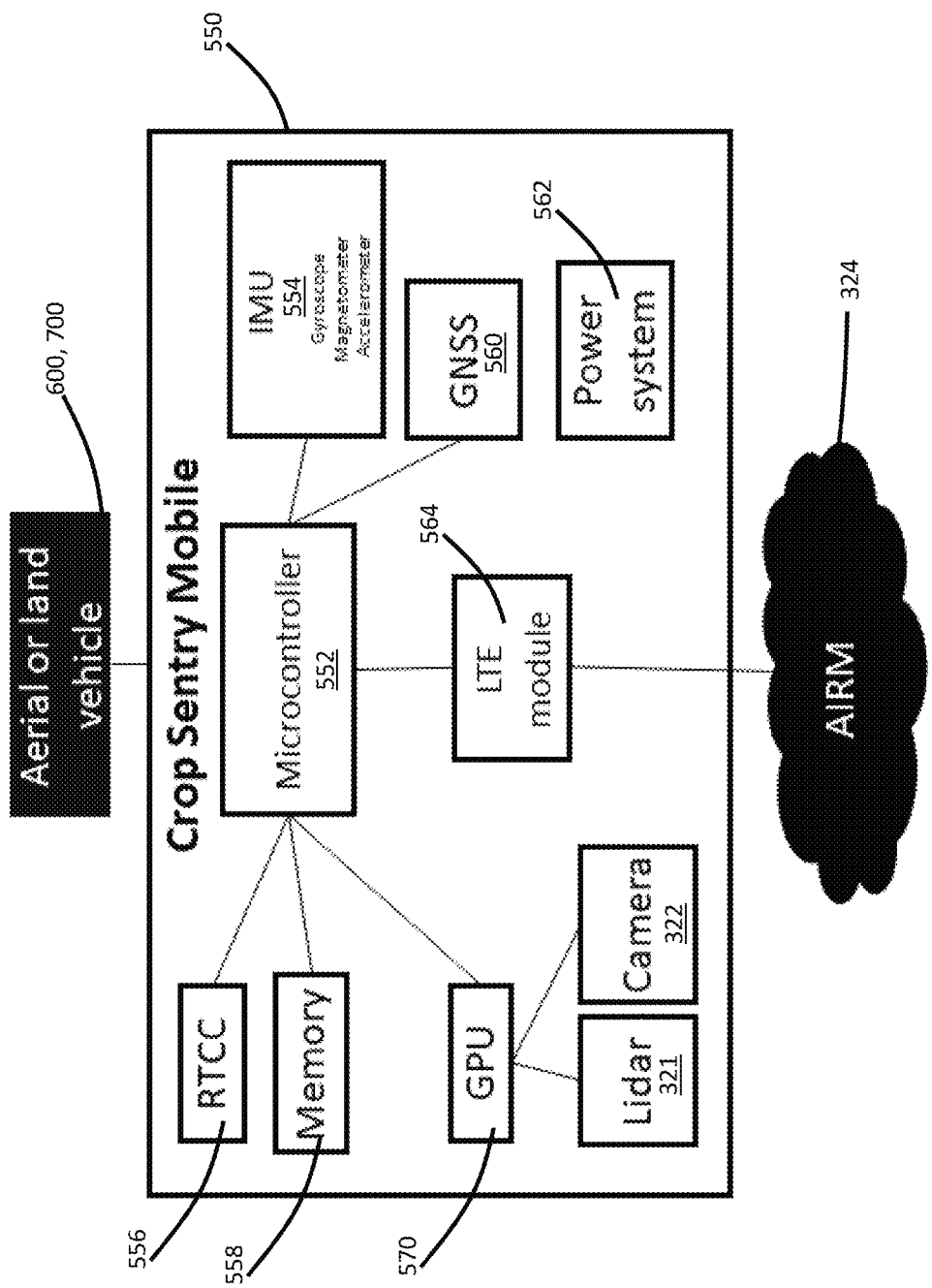
FIG. 11 is a block diagram of a processing structure for the field monitor.

As demonstrated in FIG. 11, the processing structure 550 within the housing 502 of the mobile field monitor 500 may comprise a microcontroller 552 executing one or more instructions from memory 558 and/or retrieving and storing data to the memory 558. The microcontroller 552 may transmit the above-ground field data 804 and/or the positioning data to the cloud storage 324 via a communication module 564, such as an LTE module. A timing of the microcontroller 552 may be determined by a real-time clock controller 556.

The microcontroller 552 may retrieve navigational data from an inertial measurement unit (IMU) 554 and/or a Global Navigation Satellite Systems (GNSS) 560. The positioning data provided by the IMU 554 may comprise inertial data and/or real-time kinematics (RTK) data. The inertial data, RTK data, and/or the GNSS data may be fused together using a sensor fusion process executing on the microcontroller 552. The IMU 554 may comprise a 9-axis inertial motion sensor (3-axis gyroscope, 3-axis accelerometer, and 3-axis magnetometer). In some aspects, the GNSS 560 may be located in the mobile platform 600, 700 and may receive the positioning data from the positioning antenna 608. The microcontroller 552 may receive the positioning data from the mobile platform 600, 700 via at least one of the ports 510.

The microcontroller 552 may communicate with an onboard graphical processing unit (GPU) 550. The GPU 570 may pre-process image data from the camera 322 and/or may pre-process point cloud data from the LiDAR sensor 321 as described in further detail with reference to FIG. 15 below. The GPU 570 may then provide the pre-processed data to the microcontroller 552 for transmission to the cloud storage 324 via the LTE module 564. The point cloud data may be colorized based on the captured image data and all colorized 3D point clouds may be registered together to generate a 3D map of the field.

In some aspects, the above-ground field data 804, the positioning data, the point cloud data, and/or the colorized point cloud data may be compressed and/or encrypted by the microcontroller 552 and/or a graphical processing unit (GPU) 550 prior to being sent to the cloud storage 324. As the data collection happens while the mobile field monitor 500 is in motion, the microcontroller 552 may cache or temporarily store the above-ground field data 804, the positioning data, the point cloud data, and/or the colorized point cloud data. A size of the temporary storage may be determined based at least on a speed of the connection to the cloud storage 324. The data may be uploaded once the mobile platform 600, 700 starts moving and may continue after the mobile platform 600, 700 comes to a stop.

In some aspects, the mobile field monitor 500 may communicate with the stationary field monitor 300 of the stationary collection system 350 via the WiFi transceiver module 312. The stationary collection system 350 may then communicate the data from the mobile field monitor 500 to the host server 324. Alternatively, the stationary field monitor 300 may transfer data from the stationary collection system 350 via the WiFi transceiver module 312 to the mobile field monitor 500. The mobile field monitor 500 may then relay the data from the stationary field monitor 300 to the host server 324.

Figure 12:
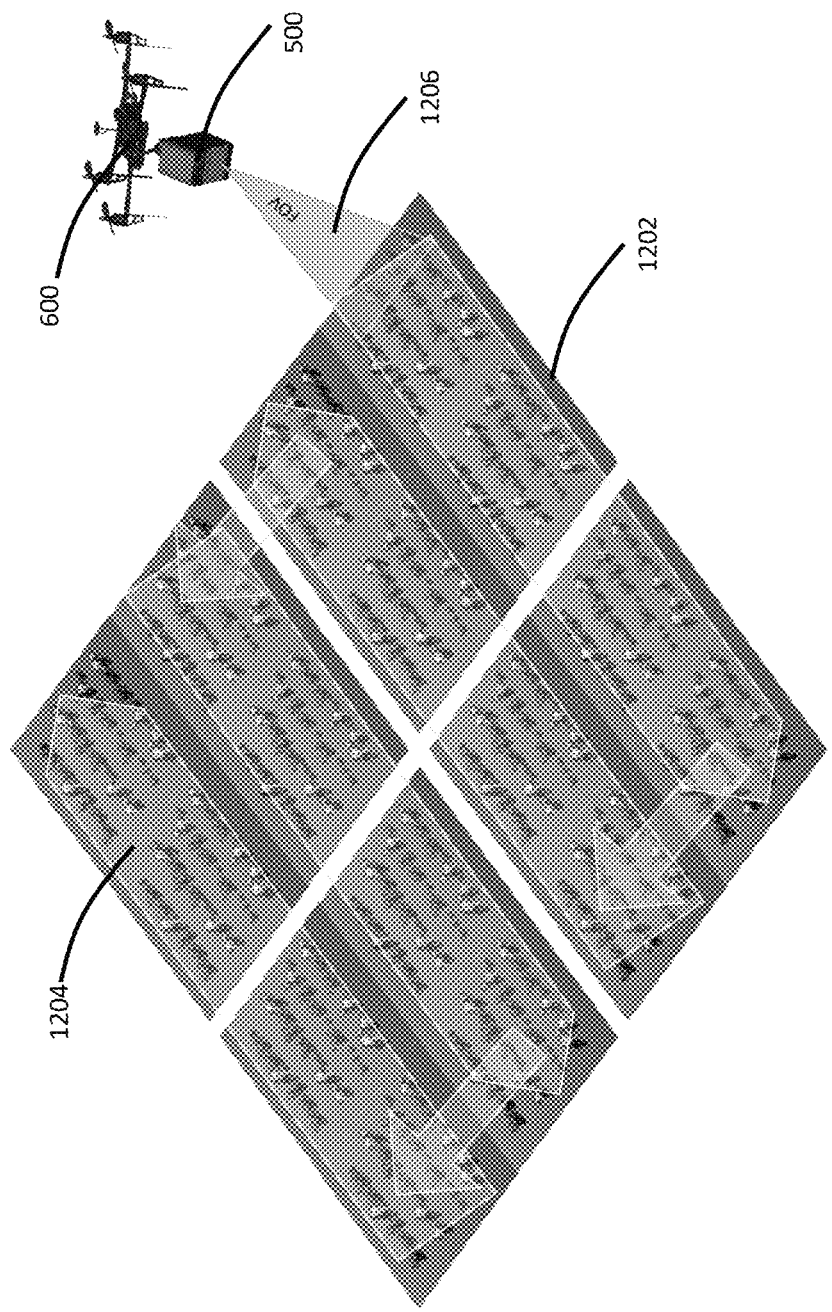
FIG. 12 is a top perspective view of a scanning operation using the field monitor coupled to the drone.

Turning to FIG. 12, the microcontroller 552 may receive a field plan 1202 comprising one or more boundaries and/or crop rows of a field to be scanned by the aerial drone 600. The microcontroller 552 may execute a trajectory mapping process to perform a scanning path 1204 of the field plan 1202. In this aspect, the trajectory mapping process may determine the scanning path 1204 to be in a direction of the crop rows and in a back and forth pattern across the field plan 1202. Although the example provided in FIG. 12 shows a simplified rectangular field, other aspects may have more complex field plans 1202. The scanning path 1204 may be determined based on a flight altitude and/or a field-of-view (FOV) 1206 of the LiDAR sensor 321. In this aspect, the flight altitude is approximately 30-meters with a FOV 1206 of approximately 80-degrees. In other aspects, the scanning path may be predetermined and retrieved by the microcontroller 552 from the cloud storage 324.

The microcontroller 552 may provide the scanning path 1204 to the mobile platform 600 in order to navigate the drone over the field. While the mobile platform 600 follows the scanning path 1204, the microcontroller 552 may instruct the GPU 570 to capture image data from the camera 322 and point cloud data from the LiDAR sensor 321. If the microcontroller 552 determines that the mobile platform 600 has stopped, the microcontroller 552 may instruct the GPU 570 to stop the camera 322 from capturing image data and the LiDAR sensor 321 from capturing point cloud data.

Figure 13:
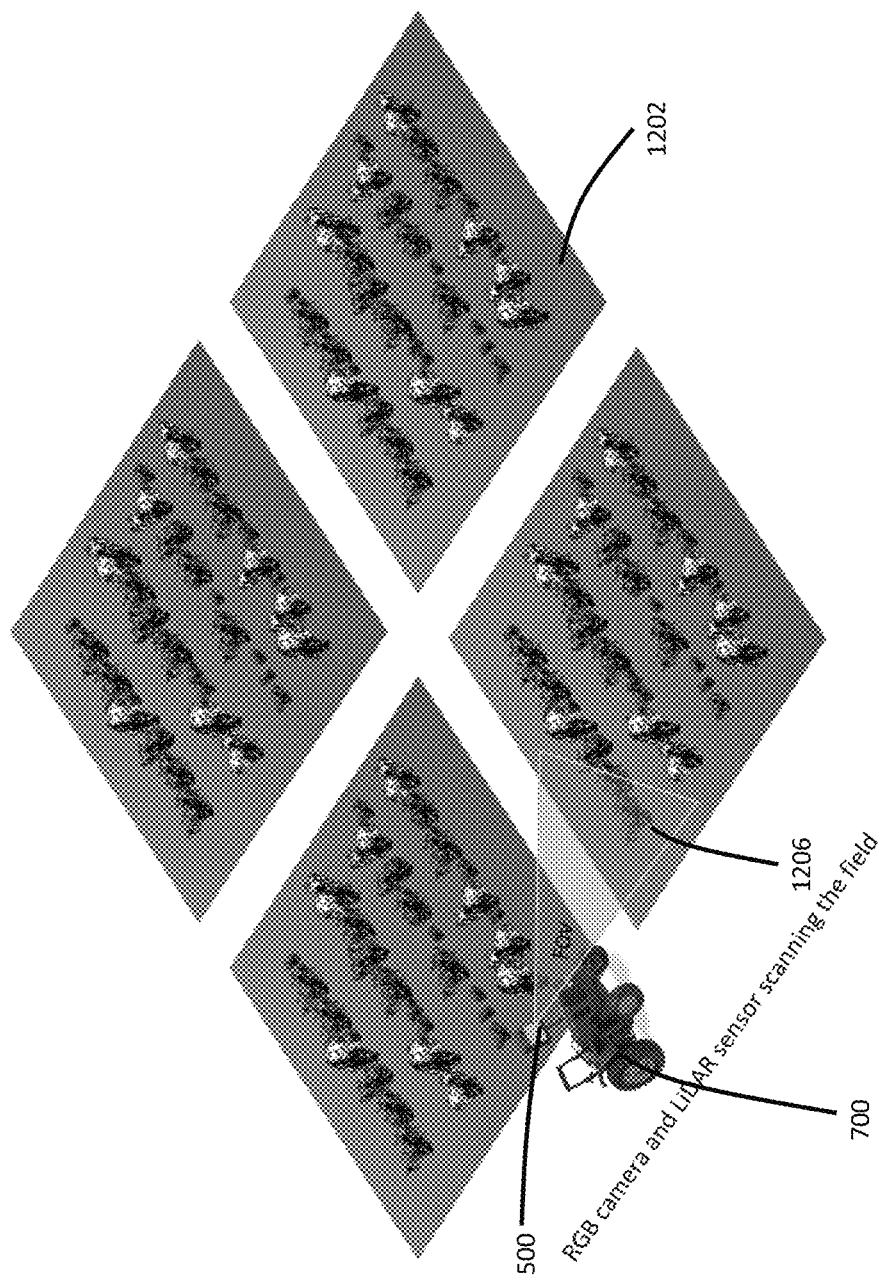
FIG. 13 is a top perspective view of the scanning operation using the field monitor coupled to a tractor.

In another aspect shown in FIG. 13, the microcontroller 552 may receive the field plan 1202 comprising one or more boundaries and/or crop rows of the field to be scanned by the ground-based vehicle 700. The ground-based vehicle 700 may perform a continual capture of above-ground field data 804 as previously described. The ground-based vehicle 700 may travel along access routes in order to not damage the crops. As the field of view 1206 is more aligned along the surface of the field, the processing of the image data from the camera 322 and the point cloud data from the LiDAR sensor 321 may more closely resemble that of the stationary collection system 350. The image data and point cloud data may be subject to a shadowing effect from the crops.

Figure 14:
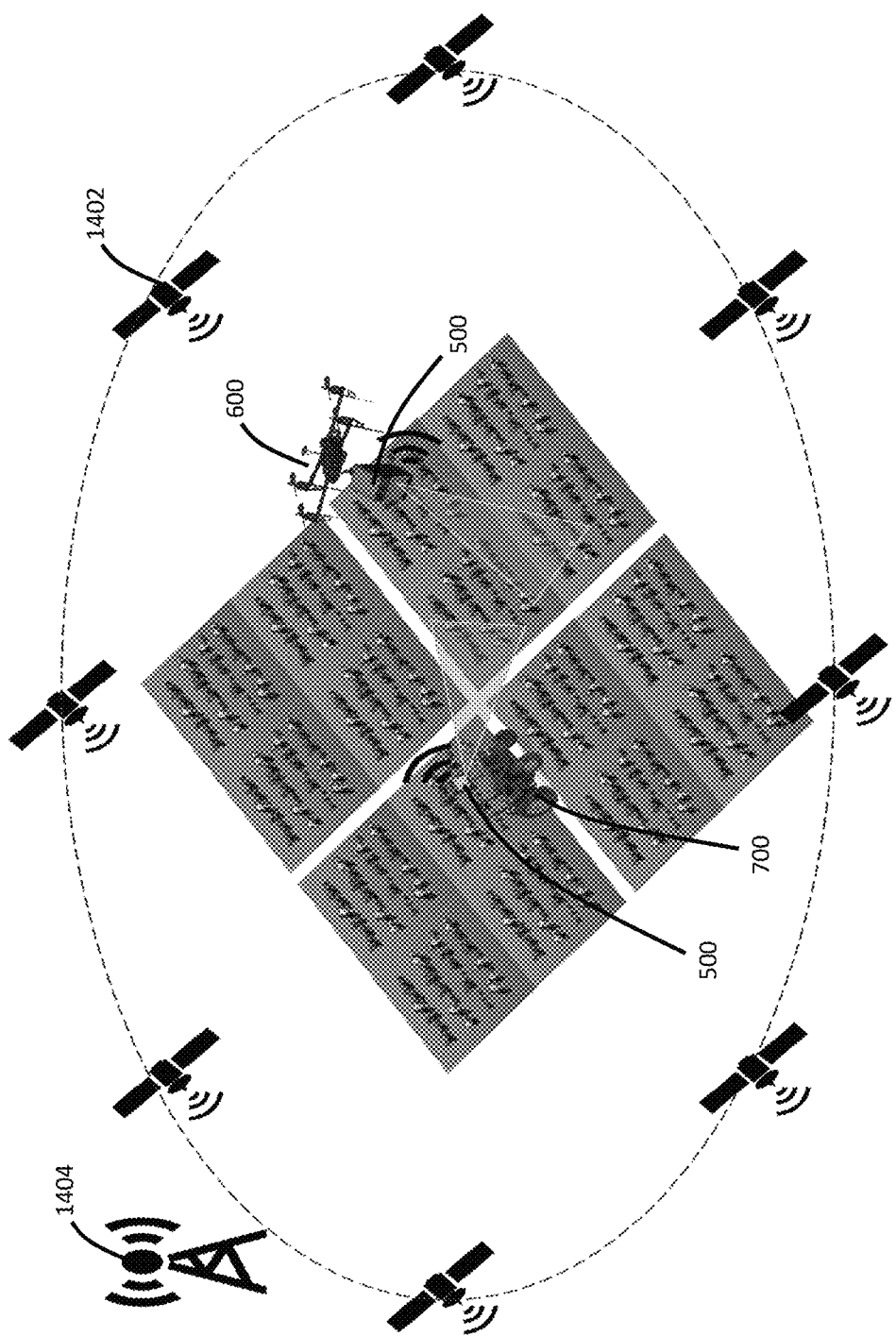
FIG. 14 is a top perspective view of a pair of mobile platforms (e.g. drone and tractor) determining position using a global positioning system (GPS)

As shown in FIG. 14, a plurality of mobile platforms 600, 700 may be used to scan the field. The positioning data for each of the mobile platforms 600, 700 may be determined by the microcontroller 552 of each respective mobile platform 600, 700 calculated based on timing data received from one or more GNSS satellites 1402. An accuracy of the positioning data may be improved by post-processing the timestamp data for each of the positioning data sources. A known orbit of each of the visible satellites 1402 may be measured and compared with satellite tracking data from the positioning data of each respective mobile platform 600, 700 and/or from nearby ground stations 1404. At times, three or more satellites may have a shared view of both the mobile platforms 600, 700 and the ground station(s) 1404. By comparing an azimuth and an elevation in $GPGSV messages, the positioning data may be corrected and triangulated more accurately.

A precise geolocation for each of the mobile platforms 600, 700 may be achieved using the fused inertial data, RTK data, and/or the GNSS data and may be further enhanced by post-processing referencing multiple other locations' data for triangulation. The inertial measurement data, the GPS strings, the image data, the point cloud data may each be accurately timestamped.

Figure 15:
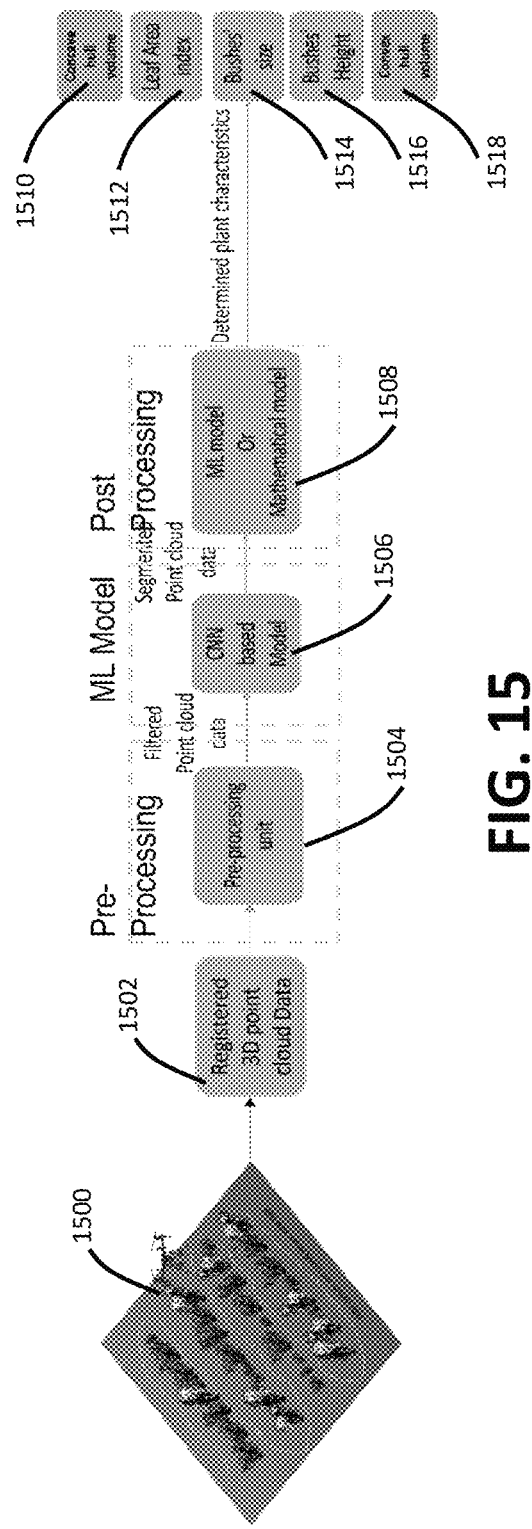
FIG. 15 is a block diagram of processing performed by the processing structure of the field monitor.

Turning to FIG. 15, a set of the colorized point cloud data may be recorded at step 1500 by each of the processing structures 550 associated with each of the mobile platforms 600, 700. A registration process 1502 may use the precise geolocation to calculate a registration of multiple colorized 3D point clouds from the GPU 570 of each processing structure 550 associated with each of the mobile platforms 600, 700. The registration process 1502 may merge the multiple colorized 3D pointer clouds into a single colorized point cloud of the entire field (or fields). In some aspects, the registration process 1502 may also incorporate the colorized 3D point clouds from the stationary collection system 350 as previously described. For example, the registration process 1502 may use the position of the stationary collection system 350 and associated crop data to: aid in georeferencing, provide corrections to the maps of the stationary collection system 350, and/or supplement the other device readings.

At step 1504, the single colorized point cloud may be pre-processed by applying a noise reduction process, a filtering process, and/or an outlier removal process. During the pre-processing stage 1504, one or more statistical methods may be used to remove noise and/or unwanted data (e.g. the ground), such as outliers, from the 3D point cloud data to form a noise reduced point cloud data. The preprocessing stage 1504 may determine one or more rows of crop plants in order to assist in determining outliers and/or noise.

Figure 16:
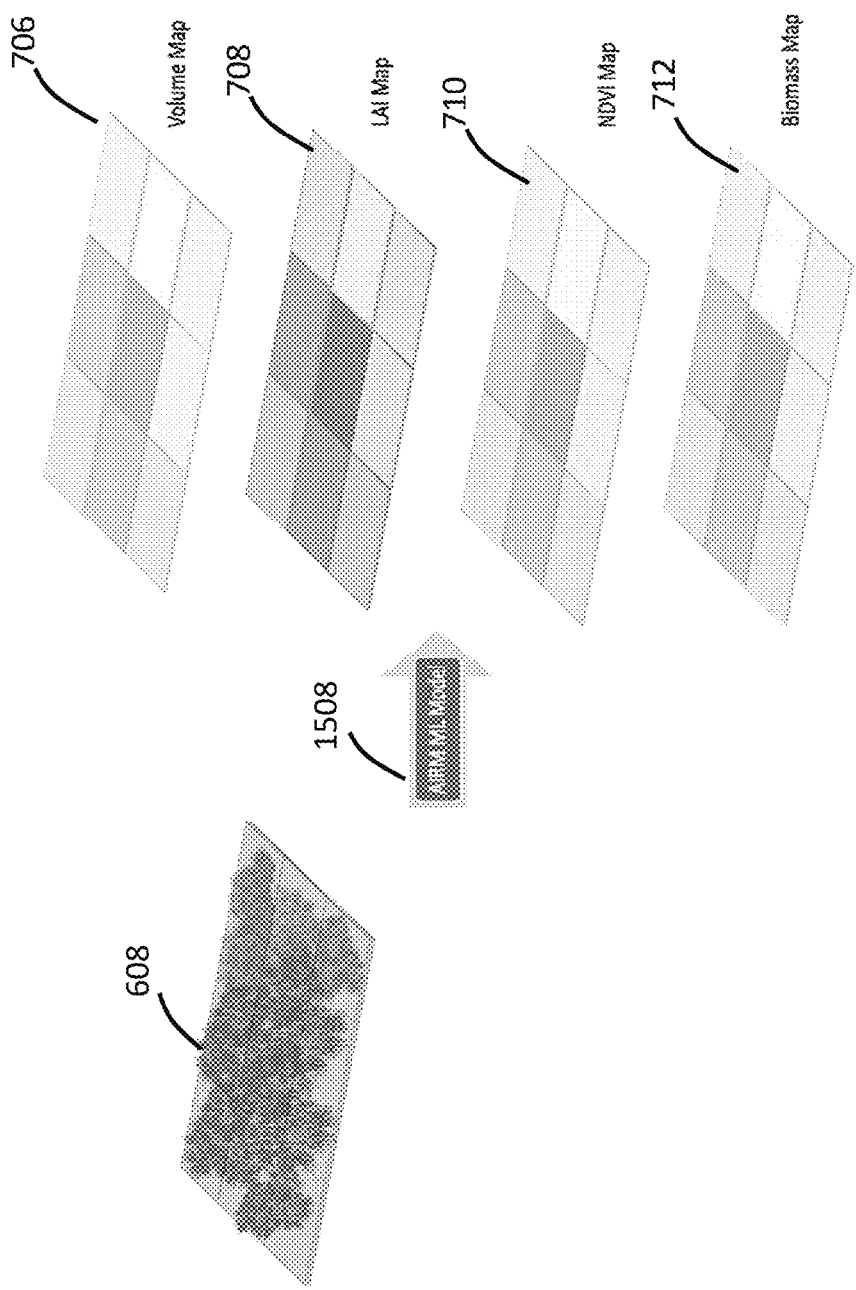
FIG. 16 is a diagram of the point cloud data conversion to a plurality of data maps.

The preprocessed data may be used by a Convolutional Neural Network (CNN) process 1506. The CNN model 1506 has previously been trained to segment one or more plants from each other. Each of the segmented plants 608 may be processed by a mathematical model and/or a machine learning (ML) model 1508 in order to determine one or more plant characteristics. The ML model 1508 may determine at least one of: concave hull volume 1510, leaf area index 1512, bush size 1514, bush height 1516, and/or convex hull volume 1518 for each of the one or more segmented plants 608. In some aspects, shown particularly in FIG. 16, the ML model 1508 may place the plant characteristics for each plant on one or more maps to produce a volume map 706, a leaf area index (LAI) map 708, a Normalized Difference Vegetation Index (NDVI) map 710, and/or a biomass map 712.

Figure 17:
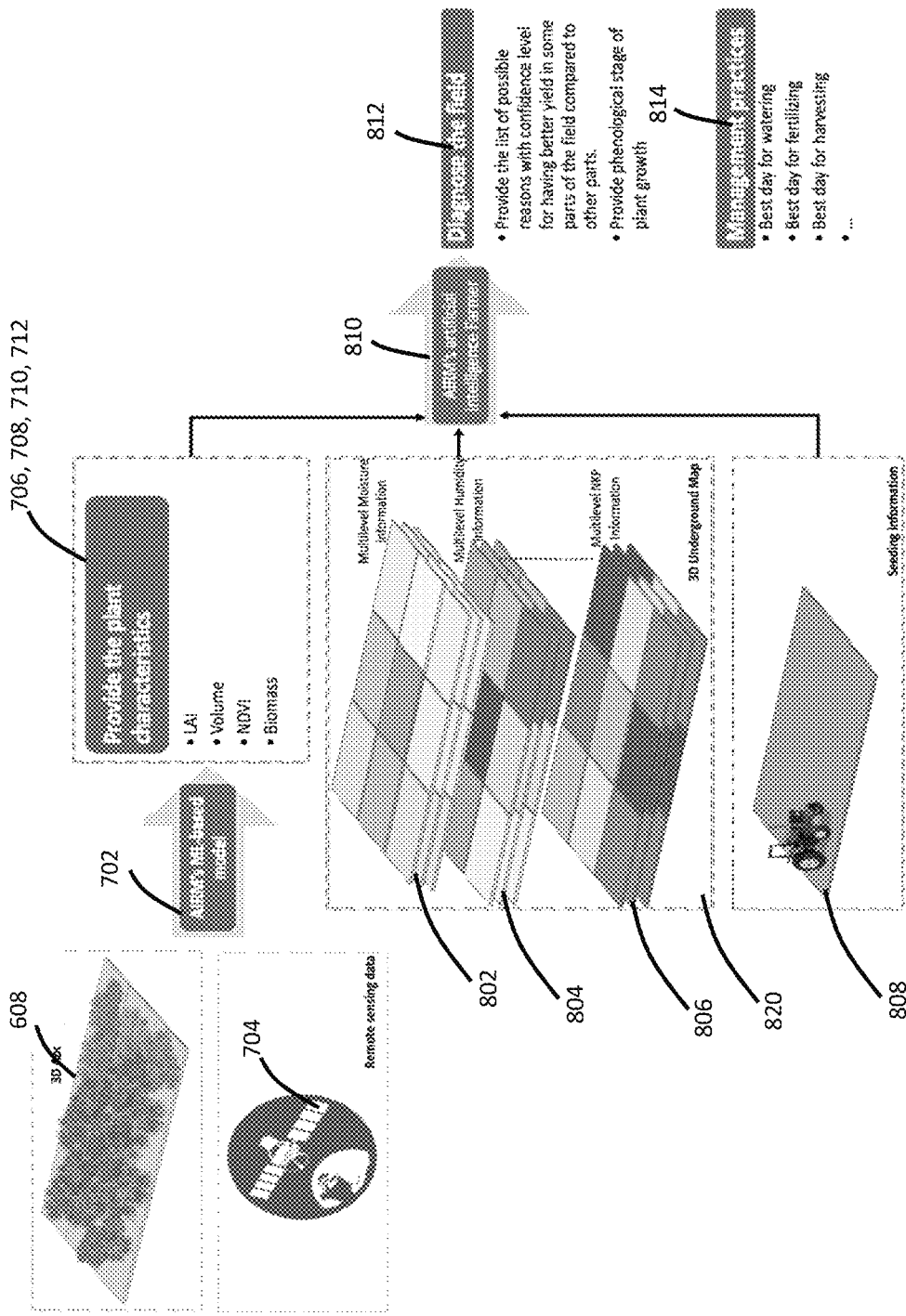
FIG. 17 is a diagram of the plurality of data maps being processed to provide a diagnosis and management plan.

As shown in FIG. 17, each of the maps 706, 708, 710, 712 may be provided to an artificial intelligence (AI) farmer model 810. The AI farmer model 810 may also process measurement data from the plurality of multi-depth sensors 200. In this aspect, the measurement data 820 (e.g. 3D underground sensor map data) may comprise multilevel moisture data 802, multilevel humidity data 804, and multilevel NKP data 806. The AI farmer 810 may also process seeding data 808. The AI farmer 810 may be trained to provide at least one diagnosis 812 for the field and/or at least one management practice 814 for the field. For example, the AI farmer 810 may compare different areas of the field and may provide a comprehensive analysis of the health of the crop. For each region of the field, the AI farmer 810 may provide a list of possible reasons for having better crop health in one region of the field versus other parts of the field. The AI farmer 810 may also provide a confidence level for each reason. The AI farmer 810 may provide a phenological stage of plant growth for each region of the field.

The AI farmer 810 may use the plant characteristics to monitor at least one of; a crop phenological state, pests, projected crop yields, and/or suggest interventions for the producer. The AI farmer 810 may provide a list of management practices 814 in order to optimize a yield for each particular region of the field. For example, the AI farmer 810 may provide an optimum day for watering, an optimum day for fertilizing, and/or an optimum day for harvesting. Other management practices 814 may involve: planting seeds on a specific date, increasing or decreasing a row spacing next season (perhaps specific parts of the field), increasing or decreasing a watering frequency, increasing or decreasing fertilizing of the crop, investigating pests, harvesting the crop on a specific date or immediately.

In a particular example for a corn crop, the AI farmer 810 may use three types of data to determine the best management practices 814. The three types of data may comprise; a set of crop-specific guidelines, a stage of growth, and/or weather data. The AI farmer 810 may determine based on one of the crop-specific guidelines that a best day for a first watering day is 15 days after seeding. The AI farmer 810 may evaluate the weather data and if the field does not have rain on days 14-16, then the AI farmer 810 may provide a notification to the farmer that irrigation/watering is required. If the AI farmer 810 determines that rain was present in the weather data on day 16, then the AI farmer 810 may omit the watering notification.

Similarly for harvesting, one of the crop-specific guidelines may be that a best day for harvesting is 20 days after a flowering stage. The AI farmer 810 may process the colorized point cloud to determine when sufficient amount (e.g. 85%-100%) of the field has reached a flowering stage. The AI farmer 810 may then notify the farmer and/or schedule a harvest day in a calendar of the farmer.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A multi-depth sensor comprising:
a global positioning sensor;
at least two sets of agricultural sensors located close to at least two different depths;
a processing structure executing a plurality of instructions stored on a tangible computer-readable memory, the instructions comprise:
sampling at least one measurement from the at least two sets of agricultural sensors; and
storing the at least one measurement on the memory.

2. The multi-depth sensor according to claim 1, further comprising a pipe housing the at least two sets of agricultural sensors beneath a ground surface.

3. The multi-depth sensor according to claim 2, further comprising an above-ground pipe; and a housing coupled thereto for holding at least the processing structure and the computer-readable memory.

4. The multi-depth sensor according to claim 3, wherein the above-ground pipe comprises a striking surface for driving the pipe housing beneath the ground surface.

5. The multi-depth sensor according to claim 2, wherein the at least two sets of agricultural sensors are spaced at uniform depths beneath the ground surface.

6. The multi-depth sensor according to claim 2, wherein the at least two sets of agricultural sensors are spaced at varying depths beneath the ground surface.

7. The multi-depth sensor according to claim 1, wherein the at least one agricultural sensor is selected from at least one of: a moisture sensor, a temperature sensor, a nitrogen/phosphorus/potassium (NPK) sensor, a solar radiation sensor, a rain gauge, and a wind speed sensor.

8. The multi-depth sensor according to claim 1, wherein instructions further comprise: communicating the stored measurement via a wireless module to at least one of: a stationary field monitor, a host server, and a mobile field monitor.

9. A field monitor for use with a mobile platform, the field monitor comprising:
a housing coupled to the mobile platform;
a camera;
a Light Detection and Ranging (LiDAR) sensor;
a processing structure executing a plurality of instructions stored on a tangible computer-readable memory, the instructions comprise:
capturing point data from the LiDAR sensor;
capturing image data from the camera;
generating an above-ground field data from the image data and the point data; and
determining crop characteristic data based at least on the above-ground field data.

10. The field monitor according to claim 9, wherein the instructions further comprise: filtering the above-ground field data prior to determining the crop characteristic data.

11. The field monitor according to claim 9, wherein the instructions further comprise: filtering the point data set prior to generating the above-ground field data.

12. The field monitor according to claim 9, wherein the instructions further comprise: segmenting crop data points from the above-ground field data as part of the determining of the crop characteristic data.

13. The field monitor according to claim 9, wherein the processing structure comprises a graphical processing unit (GPU).

14. The field monitor according to claim 9, further comprising: a wireless transceiver; and wherein the instructions further comprise: receiving below-ground field data from at least one multi-depth sensor.

15. A field data collection system comprising at least one of:
a stationary field monitor and at least one mobile field monitor capturing above-ground field data;
the stationary field monitor and each of the at least one mobile field monitor having an associated GPS therewith; each of the associated GPS providing GPS data;
at least one multi-depth sensor capturing below-ground field data and communicating the below-ground field data to the stationary field monitor; and
a GPU processing the above-ground field data and the GPS data to generate a point cloud data set.

16. The field data collection system according to claim 15, wherein the stationary field monitor comprises a Light Detection and Ranging (LiDAR) sensor and a camera; and each of the at least one mobile field monitor comprises an associated Light Detection and Ranging (LiDAR) sensor and an associated camera; the LiDAR sensor, the associated LiDAR sensors, the camera, and the associated cameras together providing the above-ground field data.

17. The field data collection system according to claim 16, wherein the above-ground field data comprises image data and point data.

18. The field data collection system according to claim 17, wherein the GPU filters the image data and the point data.

19. The field data collection system according to claim 18, wherein the GPU segments a plurality of crop data points from the cloud point data set to determine crop characteristic data.

20. The field data collection system according to claim 19, wherein the GPU adjusts the crop characteristic data in response to the below-ground field data.

* * * * *